United States Patent [19]

Onojima et al.

[11] Patent Number: 4,487,748
[45] Date of Patent: Dec. 11, 1984

[54] PROCESS FOR TREATING EXHAUST GASES

[75] Inventors: Yoshio Onojima; Kenichi Yoneda, both of Hiroshima; Yoshihiko Kamimura, Tokyo; Akira Shimada, Kawasaki; Masahiko Noguchi, Koganei, all of Japan

[73] Assignee: Mitsubishi Heavy Industries, Ltd., Tokyo, Japan

[21] Appl. No.: 417,164

[22] PCT Filed: Mar. 13, 1979

[86] PCT No.: PCT/JP79/00064
§ 371 Date: Sept. 13, 1982
§ 102(e) Date: Sept. 13, 1982

[87] PCT Pub. No.: WO79/00754
PCT Pub. Date: Oct. 4, 1979

Related U.S. Application Data

[63] Continuation of Ser. No. 170,661, Nov. 9, 1979.

[51] Int. Cl.³ .............................................. B01D 53/34
[52] U.S. Cl. .................................... 423/240; 423/210; 423/241; 423/242
[58] Field of Search .............. 423/210 R, 220, 240 R, 423/241, 242 A, 234

[56] References Cited

U.S. PATENT DOCUMENTS

| | | | |
|---|---|---|---|
| 1,897,725 | 2/1933 | Gaus et al. | 423/420 |
| 2,878,099 | 3/1959 | Breuing et al. | 423/234 |
| 3,556,721 | 1/1971 | Radusch | 423/220 X |
| 3,927,178 | 12/1975 | Jordon et al. | 423/242 A |
| 3,969,482 | 7/1976 | Teller | 423/240 X |
| 3,984,523 | 10/1976 | Schäfer et al. | 423/240 |

FOREIGN PATENT DOCUMENTS

| | | | |
|---|---|---|---|
| 952692 | 8/1974 | Canada | 423/210 |
| 44-2707 | 1/1968 | Japan . | |
| 47-31868 | 11/1972 | Japan . | |
| 49-30264 | 3/1974 | Japan . | |
| 51-107278 | 9/1976 | Japan . | |
| 52-88580 | 7/1977 | Japan . | |

*Primary Examiner*—Earl C. Thomas
*Attorney, Agent, or Firm*—Wyatt, Gerber, Shoup, Scobie and Badie

[57] ABSTRACT

In an exhaust gas scrubber having a plurality of absorption sections which are supplied with a chemical liquid for gas-liquid contacting, fresh liquid for makeup use is supplied to the section closest to the gas outlet and then is mixed gradually with the liquid being recycled to the section on the gas inlet side of the vessel, whereby the process permits exhaust gases with saturation humidity at temperatures of 75° C. or upwards to be treated effectively with but a limited drainage of water.

2 Claims, 2 Drawing Figures

PROCESS FOR TREATING EXHAUST GASES

This is a continuation of application Ser. No. 170,661 filed Nov. 19, 1979.

TECHNICAL FIELD

This invention relates to a process for treating exhaust gases in a scrubber by removing acidic gases, such as HCl and $Cl_2$, from exhaust gas stream with a saturation humidity at a temperature over 75° C., while limiting the drainage of water out of the system to not more than 0.5 l/H per 1 $m^3N/H$ of exhaust gas (wet gas).

BACKGROUND ART

Heretofore, the treatment of exhaust gases to achieve the above art has been done either by an absorption column filled with packing material as shown in FIG. 1 or by an absorption tower of venturi type in which liquid drops are finely divided at a high pressure loss for absorption purpose.

Referring to FIG. 1, which is a flow sheet of exhaust gas treatment in accordance with a conventional process, there is shown a conventional absorption column including an exhaust gas inlet 1, packing sections 2 filled with packing material such as Raschig rings, and a tank 3 at the bottom. Numeral 4 designates a circulating pump for a chemical liquid to be supplied at 5, 6, and 7 for circulation through the column, the supply port 5 being formed in a line on the discharge side of the circulating pump, the port 6 on the suction side, and the port 7 in the tank of the absorption column. An outlet 8 for draining the circulating liquid is usually provided in the line on the discharge side of the pump 4. The column has a cleaned exhaust gas outlet 9 at the top and an industrial water inlet 10 at the bottom.

An exhaust gas stream enters the absorption column at the inlet 1, passes through the packing sections 2, and leaves the vessel at the outlet 9. A chemical liquid is supplied to the column through the supply port at 5, 6, or 7. Industrial water is supplied through the inlet 10. The circulating liquid collected at the bottom cone or tank of the absorption column is taken out by the circulating pump 4 and is reintroduced into the column, at a point above the packing sections 2, and is sprayed into contact with the exhaust gas through the packing sections 2 to absorb harmful gaseous substances from the exhaust gas stream.

Ordinarily, for example, according to a hydrochloric-acid recovery apparatus, the waste liquid from the means descaling the surface of rolled steel plate in this apparatus contains ferrous and ferric chlorides, and the iron oxides are removed by decomposing the liquid at elevated temperature by a fluidized-bed reactor or by other means. Hydrogen chloride, HCl, that is simultaneously produced is recovered as aqueous HCl by water washing in the apparatus. For enhanced economic advantages, a compact recovery equipment is usually used to recover the hydrochloric acid in a high concentration, and therefore the HCl gas concentration at the outlet of the recovery apparatus ranges from hundreds to one thousand and several hundred parts per million. The emissions from the apparatus thus contain large proportions of harmful gases, such as HCl and $Cl_2$, soot and dust. They cannot be released as such to the atmosphere, but should be disposed of somehow or other for environmental reason.

In view of this, we made diversified attempts to develop an apparatus capable of treating exhaust gases rich in such noxious gases as HCl and $Cl_2$ that result from the process of recovering iron oxides and hydrochloric acid from the waste acids leaving acid pickling lines. As a result, it was found useful to scrub the emissions with an absorbent liquid which uses as the absorber an alkali metal or alkali earth metal, e.g., lime slurry, caustic soda solution, or ammonia solution. However, new problems arise here. In the process for recovery of hydrochloric acid from exhaust gases, water scrubbing is used to recover the objective substance in the form of aqueous hydrochloric acid, and naturally the gases during the recovery process are saturated with water and at a temperature of 75° C. or upwards, the temperature remaining unchanged at over 75° C. inside the gas scrubber. The HCl gas concentration in the treated gas discharge to the atmosphere is to be limited within several ppm by law and regulations. The quantity of water to be drained should also be minimized in the light of the restrictions on COD chemical oxygen demand, SS, suspended solid etc. in the effluent provided for in the law; draining much water by abandoning the chemical liquid in a one-pass operation is, of course, infeasible. If, for example, the liquid-gas ratio in the packing zone is in the usual range of 2.0–4.0 $l/m^3N$, the quantity of water to be drained by the one-pass system will be as much as 2.0–4.0 l per $m^3N$ of the exhaust gas per hour.

For these reasons, it has been common practice to recycle and reuse the chemical liquid.

Generally, the exhaust gases from coal-fired boilers and refuse incinerators, with moisture contents of 8–30% and at temperatures of about 150°–180° C., are changed in scrubbers to be gases with saturation humidity at temperatures at or below 75° C. In order to dispose of the $SO_2$, HCl, HF, and $Cl_2$ in these exhaust gases, the scrubbers are designed to have absorption capacity coefficients (absorption capabilities) in the range of 800–900 kg/mol/$m^3$.hr.atm, and hence are compact in construction. However, the exhaust gases at extremely high temperatures or with high humidity values will still maintain high temperatures within the scrubbers. When harmful gaseous substances in low concentrations are to be absorbed from an exhaust gas charge at a high temperature in a scrubber, the resistance on the part of the liquid will be so high that the absorption capacity coefficient (absorbability) of the scrubber will decrease and, to make up for this, the apparatus will have to be large in size. Experiments indicated that, where the temperature inside the scrubber was 84° C. and the hydrochloric acid gas concentration at the outlet was 5 ppm, the absorption capacity coefficient (absorbability) was at most 100–200 kg-mol/$m^3$.hr.atm, and the scrubber had to be from five to six times as large as the normal size. In another experiment a heat exchanger was employed to lower the exhaust gas temperature in a scrubber and an absorption test was conducted with a circulating liquid at below 75° C. This installation proved of no practical use because of the large size of the heat exchanger and ancillary arrangements and also of the oversize of the utilities required.

DISCLOSURE OF THE INVENTION

In view of the foregoing, the present invention has for its object the provision of a process for treating exhaust gases, whereby exhaust gases with a saturation humidity are treated at temperatures not lower than 75° C. in a scrubber, with a less quantity of water drained than heretofore. After extensive investigations we have now found that, whereas the absorption efficiency will be lowered, when the activity of the absorbent liquid is low, by decreases in the concentrations of HCl, Cl$_2$, etc. in exhaust gas at a high temperature, the efficiency will not drop as long as the absorbent liquid is kept highly active. It has also been found that, for HCl and Cl$_2$ in low concentrations, only the fresh makeup liquid is utilized, and efficient absorption is possible with a limited amount of the chemical liquid. The activity of the absorbent liquid is related to a number of factors including the Na utilization rate defined by Eq. (1) in Example 1 to be given later, and the SS concentration and pH of the absorbent liquid.

As a result, a process has been devised in which three or more absorption sections are provided in an exhaust gas scrubber, fresh chemical liquid for makeup use is sprayed over the absorption section in the uppermost stage, the sprayed liquid is mixed with the liquid being circulated through the absorption section in the lower stage and the mixture is recycled, and then part of the recycled liquid is drawn out and is mixed with the liquid circulating through the lowermost-stage absorption section for further recycling. In this way the gas portion containing the acid gases, such as HCl and Cl$_2$, in high concentrations was largely absorbed from the exhaust gas composition by the low-activity circulating liquid in the lowermost stage, and the gas portion with HCl, Cl$_2$, etc. in low concentrations was absorbed by the high-activity circulating liquid in the upper stage. For the gas with even lower concentrations of HCl, Cl$_2$, etc., a small amount of fresh makeup liquid with the highest activity was sprayed over the absorption section in the uppermost stage. Thus, HCl and Cl$_2$ could be efficiently absorbed in absorption sections of a small overall volume.

The present application provides the following inventions:

(1) A process for treating emissions by an emission scrubber having a plurality of absorption sections which are supplied with a chemical liquid for gas-liquid contacting, which process comprises supplying a fresh chemical liquid for makeup use to the absorption section closest to the gas outlet, sending said chemical liquid to the absorption sections close to the gas inlet, and then gradually mixing the same with the liquid portions being recycled through the latter sections.

(2) A process for treating exhaust gases which comprises spraying a chemical liquid over an absorption section provided in an exhaust gas scrubber and thereby circulating the liquid therethrough, and spraying a separate chemical liquid for makeup use over another absorptioh section provided above said absorption section, and (3) A process for treating exhaust gases which comprises providing three or more absorption sections in an exhaust gas scrubber, spraying a chemical liquid for makeup use over the absorption section in the uppermost stage, mixing the sprayed liquid with the liquid portion circulating through an absorption section in the lower stage and spraying the mixing liquid over said lower-stage absorption section for circulation therethrough, drawing out part of the liquid for recycling through a desired number of absorption stages provided, and then mixing the liquid with the liquid portion circulating through the absorption section in the lowermost stage and spraying the mixed liquid over the last-mentioned section for circulation therethrough.

BEST MODE FOR CARRYING OUT THE INVENTION

Figure 2:
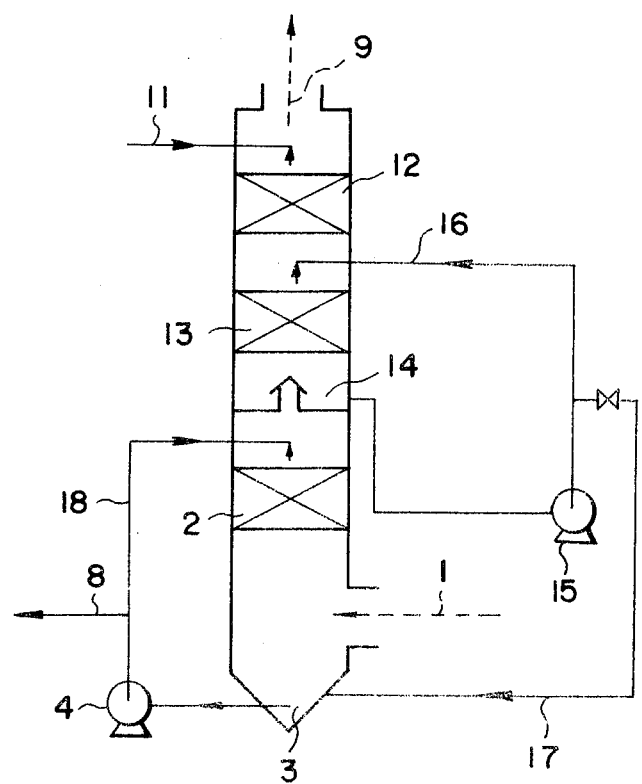
FIG. 2 is a flow sheet embodying the present invention.

In FIG. 2, which is a flow sheet of an embodiment of the present invention in which packing material was filled with in an absorption column and, there are shown an exhaust gas inlet 1, a packing section 2 in the lower stage of an absorption column filled with packing material, such as Raschig rings, a tank 3 at the bottom of the column, a circulating pump 4 connected to the lower stage of the column, and a line 8 for draining the circulating liquid from the lower stage of the column. The line 9 denotes an exhaust outlet. The numeral 11 indicates a line and port for supplying a chemical liquid to the packing section in the uppermost stage of the column, 12 is the uppermost packing section filled with the same Raschig rings or suchlike packings as in the lower-stage packing section, and 13 is another packing section in the upper stage with the same Raschig rings or the like. 14 is an upper-stage tank in the absorption column, 15 is a circulating pump for the upper stage of the column, 16 is a line and port provided above the upper-stage packing section for supplying the chemical liquid to the same section of the column, 17 is a line connected to the discharge side of the upper-stage circulating pump 15 to draw out part of the circulating liquid from the upper stage of the column, and 18 is a line and port provided above the lower-stage packing section 2 of the column for supplying the chemical liquid to the same section.

The operation of the apparatus according to the invention will now be described with reference to FIG. 2. Exhaust gas containing HCl and Cl$_2$ is introduced into the absorption column at the inlet 1. The chemical liquid is supplied to the column at the supply port 11 above the packing section 12 in the uppermost stage of the column. The liquid thus supplied is sprayed over the uppermost stage packing section 12 into contact countercurrent with the exhaust gas in an upward flow to absorb harmful gaseous contents therefrom. The liquid that has passed the packing section 12 enters the upper-stage section 13, where it contacts the ascending exhaust gas further to absorb the pollutants therefrom and then is collected in the upper-stage tank 14 of the column. The liquid thus collected is then drawn out by the upper-stage circulating pump 15 and is introduced through the supply line and port 16 into the space above the packing section 13 in the upper stage of the column, where it is sprayed over the section 13. The sprayed liquid falls in contact with the ascending exhaust gas through the packing section 13 to take in the noxious substances from the gas stream. At the same time, part of the chemical liquid collected in the upper-stage tank 14 is drawn out by the upper-stage circulating pump 15 through the circulating-liquid extracting line 17 on the discharge side of the pump 15 and is supplied to the lower-stage tank 3 of the absorption column. From this tank 3 the liquid is pumped up by the lower-stage circulating pump 4 into the space above the lower-stage packing section 2 through the supply line and port 18 and is sprayed over the packing section 2. The sprayed liquid again contacts the exhaust gas introduced from the inlet 1 and upcoming through the packing section 2 and absorbs HCl and Cl₂ from the charge. Falling through the lower-stage packing section 2, the chemical liquid is collected in the lower stage tank 3 of the column. Part of the liquid in the tank 3 is carried out of the absorption system through the circulating-liquid drain line 8 on the discharge side of the lower-stage circulating pump 4.

While the embodiment illustrated in FIG. 2 includes three stages of packing sections, other embodiments which may have more stages of packing sections will operate substantially in the same way.

With the afore-described construction, the present invention maintains high activity of the absorbent liquid and thereby achieves the following advantages:

(1) In an exhaust gas scrubber, HCl and Cl₂ are efficiently absorbed from the exhaust gas with a saturation humidity at a temperature of not lower than 75° C.

(2) Where the HCl and Cl₂ concentrations are low, the activity of the absorbent liquid is high, and therefore efficient absorption is accomplished.

(3) Efficient absorption is possible with a very low liquid flow rate at a liquid-gas ratio of not more than 1.0 l/m³N.

(4) The quantity of liquid to be drained can be reduced to or less than 0.5 l/H per 1 m³N/H of the exhaust gas (wet gas).

(5) The overall height of the packing sections is lower than those of the conventional arrangements and therefore the apparatus is compact in construction.

A comparative example according to a conventional process and an example of the present invention will be given below, with detailed explanation of the advantages derivable from the invention. The flow rate as well as the compositions of the exhaust gas introduced into the respective absorption columns at the inlets and discharged at the outlets were as shown in Table 1.

TABLE 1

| Composition, flow rate, etc. | | At the inlet of the apparatus | Comparative Example (at the outlet) | Ex. of the invention (at the outlet) liquid flow rate | |
|---|---|---|---|---|---|
| | | | | 3 m³/H | 5 m³/H |
| HCl (dry) | (ppm) | 850 | 150 | 4.9 | 3.6 |
| Cl₂ (dry) | (ppm) | 13 | 2.3 | 0.0 | 0.0 |
| Soot and dust | (mg/m³) | 1201 | 165 | 159 | 155 |
| Gas temp. | (°C.) | 84 | 84 | 84 | 84 |
| Gas flow rate (wet) | (m³N/H) | 11.800 | 11.800 | 11.800 | 11.800 |
| Hydrochloric acid absorption rate | (%) | — | 82.4 | 99.4 | 99.6 |
| Chlorine absorption rate | (%) | — | 82.3 | 100 | 100 |
| H₂O (wet) | (%) | 58 | 58 | 58 | 58 |
| CO₂ (wet) | (%) | 2.5 | 2.5 | 2.5 | 2.5 |
| O₂ (wet) | (%) | 3.3 | 3.3 | 3.3 | 3.3 |

COMPARATIVE EXAMPLES

Figure 1:
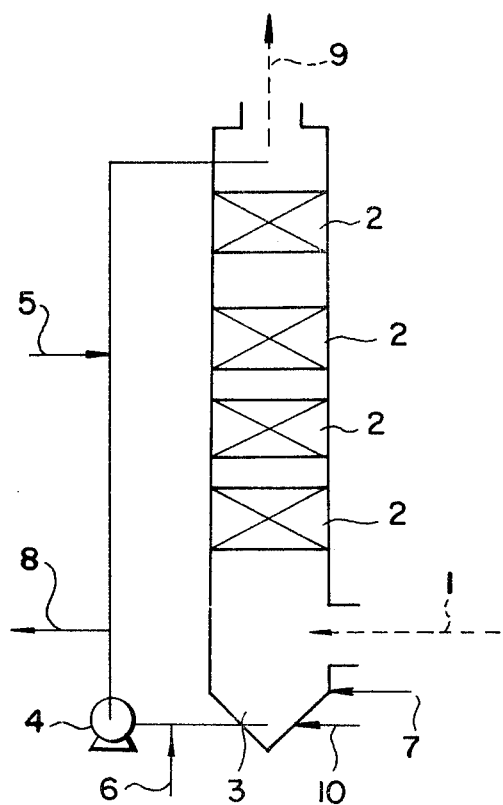
FIG. 1 is a flow sheet of exhaust gas treatment in accordance with a conventional process.

In conformity with a conventional process (FIG. 1), the exhaust gas as indicated in Table 1 was treated.

The specifications of the apparatus used were as follows:

| | |
|---|---|
| Diameter of the absorption column | 2 m |
| Overall height of the packing sections | 8 m (four 2-m stages) |
| Flow rate of circulating liquid | 60 m³/H |
| Tank capacity of the column | 5 m³ |

A 20 wt % caustic soda solution was used as the chemical liquid and supplied to the absorption column through the supply ports on the discharge and suction sides of the circulating pump 4. Industrial water was supplied from the inlet to the tank 3 at a rate of 5 m³/H. The quantity of water drained was 5 m³/H. The composition of the exhaust gas at the outlet of the apparatus is also given in Table 1. The hydrochloric acid gas absorption rate in this apparatus was approximately 82.4%. As regards the activity of the absorbent liquid in the tank of the absorption column, for example, the rate of utilization of Na in the absorbent liquid was calculated to be 53% by Eq. (1) from the results of analyses in Table 2.

$$\text{Na utilization rate} = \frac{[NaCl]^* + [NaClO]}{[NaCl] + [NaClO] + 2[Na_2CO_3] + [NaHCO_3]} \times 100 \quad (1)$$

TABLE 2

Results of analyses of absorbent liquids in two examples

| Composition, etc. | | Comparative Example (ordinary absorbent liquid) | Ex. of the invention (absorbent liquid in the packing section of) | | |
|---|---|---|---|---|---|
| | | | Lower stage | Upper stage | Uppermost stage |
| pH | — | 8.73 | 8.67 | 9.21 | 9.40 |
| Na₂CO₃ | (mol/l) | 0.000 | 0.010 | 0.022 | 0.026 |
| NaHCO₃ | (mol/l) | 0.084 | 0.031 | 0.079 | 0.084 |
| NaCl | (mol/l) | 0.081 | 0.060 | 0.003 | 0.001 |
| NaClO | (mol/l) | 0.013 | 0.011 | 0.004 | 0.001 |
| Na utilization rate (%) | | 53 | 58 | 5.5 | 1.4 |
| SS | (mg/l) | 2.000 | 2300 | 180 | 20 |

Aside from this, the activity of the absorbent liquid is related to the SS concentration in the liquid (the higher the concentration, the lower the activity) and the pH of the liquid (the activity decreasing in proportion to the pH value).

EXAMPLE

In accordance with the process of the invention (FIG. 2), the same exhaust gas was handled in the Comparative Example was treated in the following way.

The specifications of the apparatus used were as below:

| | |
|---|---|
| Diameter of the absorption column | 2 m |
| Height of the packing section | |
| in the upper stage of the column | 2 m |
| in the lower stage of the column | 2 m |
| in the uppermost stage of the column | 2 m |
| Flow rate of the circulating liquid | |
| in the upper stage of the column | 60 m³/H |
| in the lower stage of the column | 60 m³/H |
| Capacity of absorption-column tank | |
| in the upper stage | 5 m³ |

| -continued | |
|---|---|
| in the lower stage | 5 m³ |

As in comparative example, the chemical liquid in the form of a caustic soda solution was introduced into the absorption column through the line and port and sprayed, together with industrial water for makeup use, over the packing section in the uppermost stage of the column. Experimentally, the liquid was supplied in two different flow rates, 3 m³/H (at a liquid-gas ratio of 0.25 l/m³N) and 5 m³/H (liquid gas ratio, 0.43 l/m³N), and the quantities of water drained were, respectively, 3 m³/H and 5 m³/H. The exhaust gas composition at the outlet of the apparatus was as shown in Table 1. The hydrochloric acid gas absorption rate in this apparatus was about 99.4% when the liquid flow rate was 3 m³/H or 99.6% when the flow rate was 5 m³/H. With respect to the activity of the absorbent liquid the rate of utilization of Na in the absorbent liquid was calculated by Eq. (1) from the results of analyses in Table 2. The value in the circulating liquid in the lower stage of the absorption column was 58%, the value in the upper stage was 5.5%, and the value in the liquid under the uppermost stage was 1.4%. Thus, although the space inside the absorption column was divided into upper and lower stages and thereby the supply of caustic soda as the absorber was reduced in the same way as in comparative example (so that the Na utilization rate in the absorbent liquid from the liquid extracting line from the lower stage of the column was 58%), the Na utilization rate of the circulating liquid in the upper stage was 5.5%, indicating the maintenance of high activity. The activity is also related to the SS concentration and pH of the absorbent liquid, for example, in that the activity is adversely affected by an increase in the SS concentration or by a decrease in the pH value.

Where the exhaust gas being fed to the absorption column at the inlet is highly humid, a large quantity of industrial water cannot be used to make up for the evaporation. Also, the plants which are objects of pollution control are not allowed to drain much water out of the system under varied regulations. Moreover, the industrial water supply in excess of the makeup of evaporation, which is to be directly drained, is placed under restrictions, usually limited to not more than 0.5 l/H per 1 m³/N of the gas. For this reason, it has been believed in the art that, even if a packing section is installed in the uppermost stage of the absorption column, in addition to the packing section or sections in which the liquid is being circulated, the quantity of the liquid that flows in contact with the exhaust gas in one-pass operation cannot be large and therefore the absorption of noxious gases is extremely meager. In respect of the exhaust gases with saturation humidity at temperatures of over 75° C. to which the present invention is usually applicable, the makeup liquid is not more than 1.0 l/m³N in terms of the liquid-gas ratio, in relation to the quantity of drainage, even when the exhaust gas temperature or humidity is unusually high. The liquid-gas ratios of 0.25 and 0.43 l/m³N attained in the example of the invention were extremely small as compared with the flow rates of circulating liquid in conventional gas scrubbers (the liquid-gas ratio being usually in the range of 2.0–4.0 l/m³N), and ordinarily little absorption effects would be achieved with those values. Nonetheless, HCl and Cl₂ were efficiently absorbed with such liquid-gas ratios in accordance with the invention. This is attributable to the fact that the Na utilization rate of the chemical liquid in contact with the exhaust gas in the packing section in the uppermost stage was extremely low at 1.4%, because the makeup liquid was sprayed over the uppermost stage packing section. Presumably the activity of the chemical liquid was high enough to achieve the efficient concentration despite the low concentrations of HCl and Cl₂ in the exhaust, in the range below 5 ppm, and the high absorbent liquid temperature at 84° C.

When the results of the comparative example and the example of the invention were compared, it was found that, in the treatment of exhaust gas by an exhaust gas scrubber wherein the saturation temperature was 84° C. and the quantity of water drained out of the system was limited to not more than 0.5 m³/l per 1 m³N/H of (wet) exhaust gas, the process of the invention achieved very high rates of HCl and Cl₂ removal in spite of the lower overall height of the packing sections of the absorption column than the height of the conventional arrangements. Even when the absorption column was employed as a spray tower, without packing material in the absorption sections, the process of the invention proved superior to the prior art process. While the both examples have been described as handling an exhaust gas containing HCl and Cl₂ as harmful gaseous substances, other tests were conducted with the exhaust gas containing additional acidic gases of SO₂ and HF. Otherwise the experiments were performed under the same gas and operating conditions with the same equipment. (In the exhaust gas, the SO₂ concentration was 1200 ppm and the HF concentration was 50 ppm). The results demonstrated that the process of the invention was outstandingly effective with an SO₂ absorption rate of 95% and an HF absorption rate of 85% as compared with the corresponding values of 70% and 60%, respectively, according to the comparative process.

We claim:

1. A continuous process for treating exhaust gases to remove undesirable chemical components which comprises passing the exhaust gases through a gas treating system countercurrent to a liquid cleaning medium comprising an aqueous caustic soda solution, said system comprising a plurality of absorption segments arranged downstream of said exhaust gases comprising a first absorption segment and at least one intermediate segment said gas passing directly through each of said segments which comprises:
   1. Introducing exhaust gas to be treated into said absorption segment,
   2. Introducing fresh make-up cleaning medium exclusively downstream of the last absorption segment,
   3. Permitting the cleaning medium to pass through said last absorption segment and a first intermediate absorption segment upstream of the last absorption segment,
   4. Collecting the cleaning medium after it passes through the first intermediate absorption segment and recirculating a first portion of the collected cleaning medium through said first intermediate absorption segment,
   5. Circulating a second portion of the collected medium to bypass a second intermediate absorption segment and recirculating a first portion of the collected medium which has bypassed the second intermediate absorption segment to permit said portion to pass through said second intermediate absorption segment, 6. Repeating Steps 4 and 5 with successive intermediate absorption segments when such segments are present until said first absorption segment is reached, 7. Recirculating a first portion of the collected medium which has passed the last of the intermediate absorption segments to permit said portion to pass through said last intermediate absorption segment, and 8. Removing from the system a second portion of collected cleaning medium from said first absorption segment, the amount of cleaning medium removed being substantially equal to the amount of fresh make-up cleaning liquid introduced into said last absorption segment.

2. A process as claimed in claim 1 wherein the undesirable chemical components being removed are chlorine and hydrogen chloride and the make-up cleaning medium is aqueous caustic soda solution.

* * * * *